United States Patent
Cai

(10) Patent No.: US 7,314,307 B2
(45) Date of Patent: Jan. 1, 2008

(54) AUTOMATIC MOTOR-DRIVEN BLENDER CUP WITH A LEAK-FREE MAGNETIC STIRRING APPARATUS

(76) Inventor: Ying Lin Cai, 402, No.6, Yeong Feng Chih Street, Rong Chi Town, Shunde County, Guangdong (CN)

( * ) Notice: Subject to any disclaimer, the term of this patent is extended or adjusted under 35 U.S.C. 154(b) by 0 days.

(21) Appl. No.: 11/653,337

(22) Filed: Jan. 16, 2007

(65) Prior Publication Data
US 2007/0165485 A1    Jul. 19, 2007

(30) Foreign Application Priority Data
Jan. 17, 2006    (CN)    ................ 2006 2 0053932

(51) Int. Cl.
    *B01F 13/08* (2006.01)
(52) U.S. Cl. .................................... 366/273
(58) Field of Classification Search ............... 366/130, 366/205–206, 262–265, 273–274, 297, 314, 366/331; 416/3; 464/29; 417/420; 99/348; 241/282.1, 282.2
See application file for complete search history.

(56) References Cited

U.S. PATENT DOCUMENTS

| | | | | |
|---|---|---|---|---|
| 1,420,774 | A * | 6/1922 | Stainbrook | .................. 366/274 |
| 2,549,121 | A * | 4/1951 | Osterheld | .................. 366/274 |
| 2,958,517 | A * | 11/1960 | De Long et al. | ......... 435/302.1 |
| 4,424,865 | A | 1/1984 | Payton, Jr. | |
| 4,435,084 | A | 3/1984 | Calhoun et al. | |
| 5,425,579 | A * | 6/1995 | Sampson | .................. 366/130 |
| 5,639,161 | A | 6/1997 | Sirianni | |
| 5,720,552 | A * | 2/1998 | Schindlegger | .............. 366/197 |
| 5,911,504 | A * | 6/1999 | Schindlegger, Jr. | ......... 366/197 |
| 6,095,677 | A * | 8/2000 | Karkos et al. | .............. 366/274 |
| 6,336,603 | B1 * | 1/2002 | Karkos et al. | ........... 241/101.2 |
| 6,712,497 | B2 * | 3/2004 | Jersey et al. | ................ 366/274 |
| 2001/0036124 | A1 * | 11/2001 | Rubenstein | ................. 366/205 |
| 2005/0023193 | A1 * | 2/2005 | Kim | ........................... 210/85 |
| 2006/0126431 | A1 * | 6/2006 | Bhavnani | ..................... 366/314 |

FOREIGN PATENT DOCUMENTS

| | | | |
|---|---|---|---|
| JP | 06269367 A | * | 9/1994 |
| JP | 08035664 A | * | 2/1996 |
| JP | 8-256920 | * | 10/1996 |
| WO | 03/003888 A1 | * | 1/2003 |

* cited by examiner

Primary Examiner—Charles E. Cooley
(74) Attorney, Agent, or Firm—Bacon & Thomas, PLLC

(57) ABSTRACT

An automatic motor-driven blender cup with a leakage-free stirring apparatus includes a blender cup, an internal chamber, a mounting frame, a stirring shaft, a magnetic disk and a motor with a dry battery; wherein, said mounting frame and stirring shaft are disposed at the central position of the inside base wall of said blender cup; said magnetic disk is correspondently fixed inside of the bottom space of said internal chamber with central axial line in alignment with that of said stirring shaft without any physical link or contact each other; the stirring propeller on said stirring shaft will be magnetically inducted by said corresponding magnetic disk to simultaneously rotate in said internal chamber when said magnetic disk is driven by the output shaft of said motor; thus, not only the stirring effect of liquid or fluid in said internal chamber can be achieved, but also said liquid or fluid can be prevented from leakage and seepage out of the base wall of said blender cup so as to insure said motor free from premature defectively damage due to moisture erosion.

3 Claims, 7 Drawing Sheets

AUTOMATIC MOTOR-DRIVEN BLENDER CUP WITH A LEAK-FREE MAGNETIC STIRRING APPARATUS

FIELD OF THE PRESENT INVENTION

The present invention relates to the blender cup, particularly for the household or outdoor blender cup including motor-driven stirring function to rotationally stir liquid in the cup; basing mainly on the magnetic force over space so that both of the physical isolated propeller and motor output shaft can be interactively coupled to overcome the problem in liquid leakage from cup seeping into motor along output shaft gap, which always happens in the conventional blender cup and results in the drawback of shortening the service life in premature defectively damage due to moisture erosion of the blender cup.

BACKGROUND OF THE INVENTION

Currently, the structure of known conventional motor-driven stirring blender cup for the household or outdoor use is of somewhat same as disclosed in the U.S. Pat. Nos. 4,435,084 and 5,639,161 and shown in the FIG. 1. All of which, an output shaft 6 driven by the motor M is disposed in the lower section of the blender cup 1, and a propeller 4 is securely linked to said output shaft 6. Wherein, said propeller 4 is directly extended into the inside of the internal chamber 2 to rotationally stirring the liquid or fluid W infused therein; and the power source is the dry battery B of commercial availability. Further, a start switch 7 is set on the handle 3 of said blender cup 1 or somewhere convenient to activate said motor M if it depressed. Via said output shaft 6, the power of said motor M is transferred to said propeller 4 for driving it to rotationally stirring the liquid or fluid W in said internal chamber 2 of said blender cup 1.

However, the same serious drawback exists in both of conventional motor-driven blender cup aforesaid or others in commercial availability: the output shaft 6 of the motor M must pass through the bushing 5 in the base wall under said internal chamber 2 of said blender cup 1; Hence a gap δ will be formed at the contact portion between the circumference of said output shaft 6 and the inner wall of said bushing 5 due to mutual friction (as shown in the magnified view of the FIG. 1), so that the liquid or fluid W to be stirred and blended in said internal chamber 2 will leak and seep into the bottom portion of said blender cup 1 via said gap δ; Before long, it will cause motor M, dry battery B and start switch 7 short circuit or defectively damaged, and result in total malfunction of the blender cup; That is the insoluble drawback and problem exists in all conventional motor-driven blender cup of commercial availability.

Moreover, subject to the inevitable moisture leakage and seepage issue aforesaid, the manufacturer is unable to equip more than two set of propeller 4 in the internal chamber 2 to avoid augmenting the drawback of moisture leakage and seepage; Therefore, the only way for all those current motor-driven blender cups of commercial availability to meet the requirement of better well-mixed is to increase the stirring time with unavoidable side-effect of expediting depletion of the dry battery B relatively, which resulting in more expenditure for consumers to frequently replace said dry battery B; Thus, the mass consumers have to bear the extra cost due to inferior product from careless and unenterprising contrivance of the undutiful manufacturers seems senseless and unreasonable.

SUMMARY OF THE INVENTION

The main object of the present invention is to provide an automatic motor-driven blender cup with stirring apparatus of leakage-free comprising a blender cup, an internal chamber, a mounting frame, a stirring shaft, a magnetic disk and a motor with a dry battery; Wherein, said mounting frame and stirring shaft are disposed at the central position of the inside base wall of said blender cup; said magnetic disk is correspondently fixed inside of the bottom space of said internal chamber with central axial line in alignment with that of said stirring shaft without any physical link or contact each other; The stirring propeller on said stirring shaft will be magnetically inducted by said corresponding magnetic disk to simultaneously rotate in said internal chamber when said magnetic disk is driven by the output shaft of said motor; Thus, not only the stirring effect of liquid or fluid in said internal chamber can be achieved, but also said liquid or fluid can be prevented from leakage and seepage out of the base wall of said blender cup so as to insure said motor free from premature defectively damage due to moisture erosion.

The another object of the present invention is to provide an automatic motor-driven blender cup with stirring apparatus of leakage-free, wherein more than two sets of the mounting frames and stirring shafts are disposed in the bottom portion of said internal chamber including additional multiple gear set coupled with said output shaft of the motor, so that multiple sets of magnetic disks with magnetic inducted stirring propellers can be driven by one original motor in order to have better stirring speed and uniformity of blending effect.

DETAILED DESCRIPTION OF THE PREFERRED EMBODIMENTS

Figure 1:
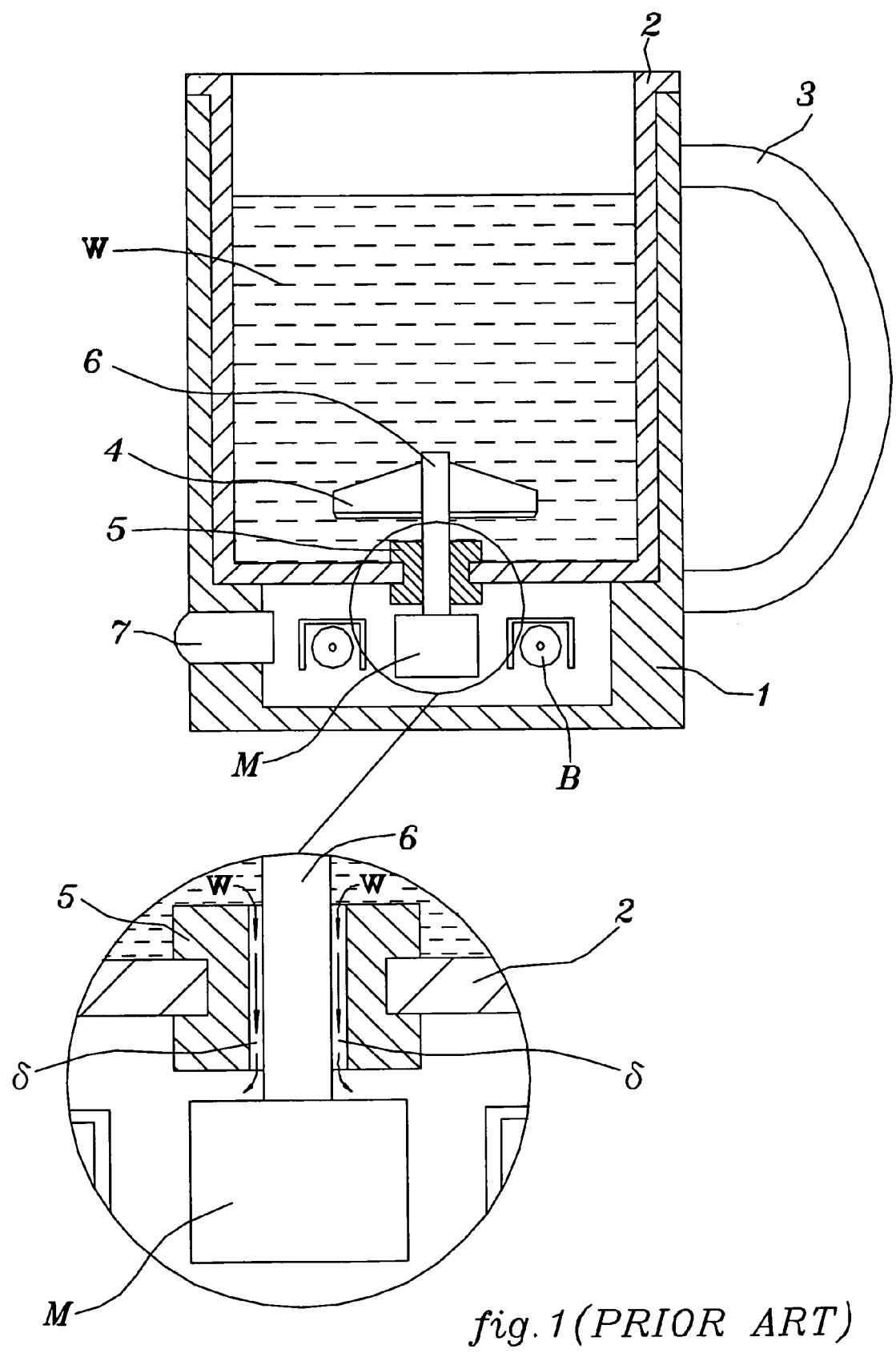
FIG. 1 is the structural illustrative view of the conventional motor-driven blender cup.
Figure 2:
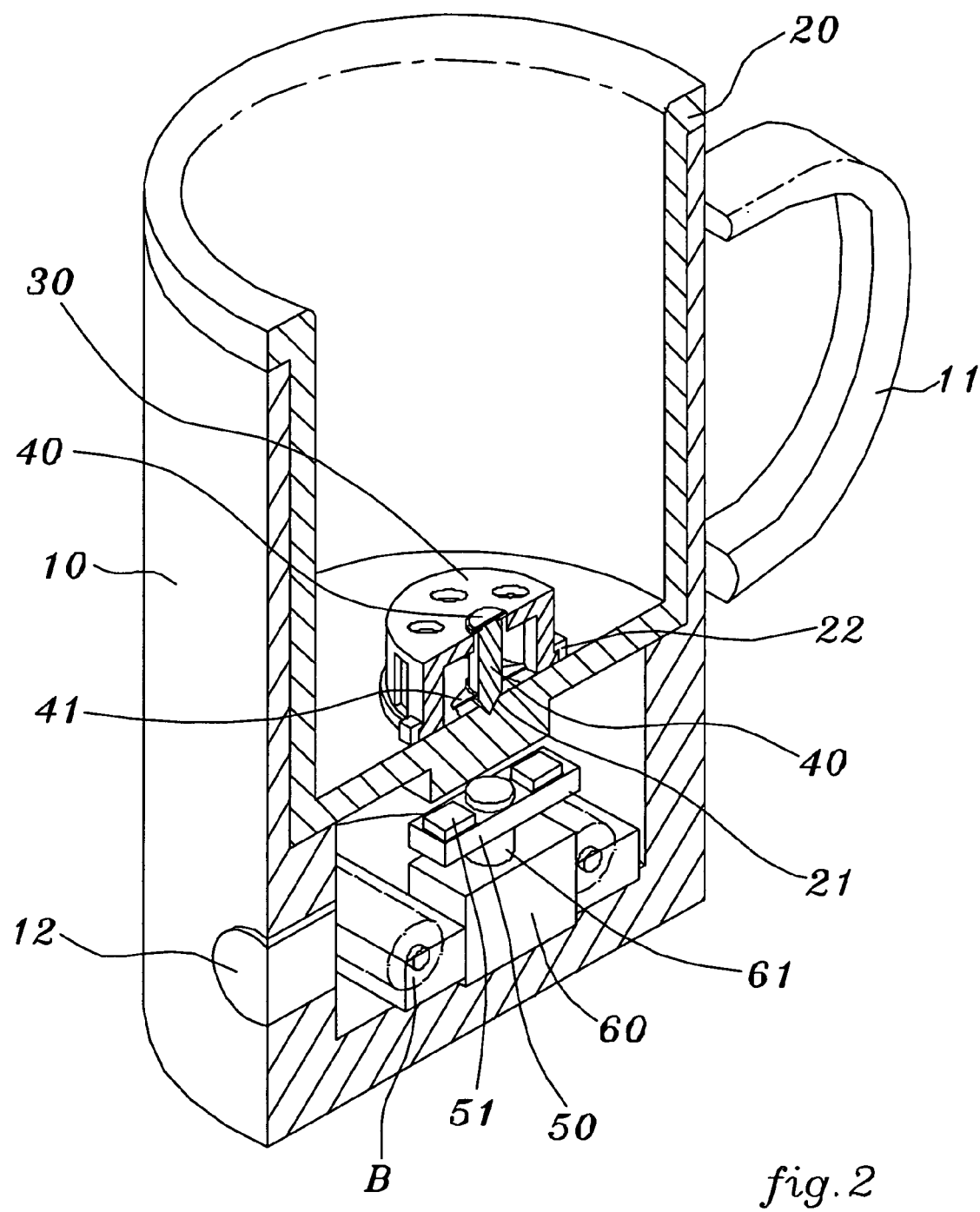
FIG. 2 is the perspective cross section view of the present invention.
Figure 4:
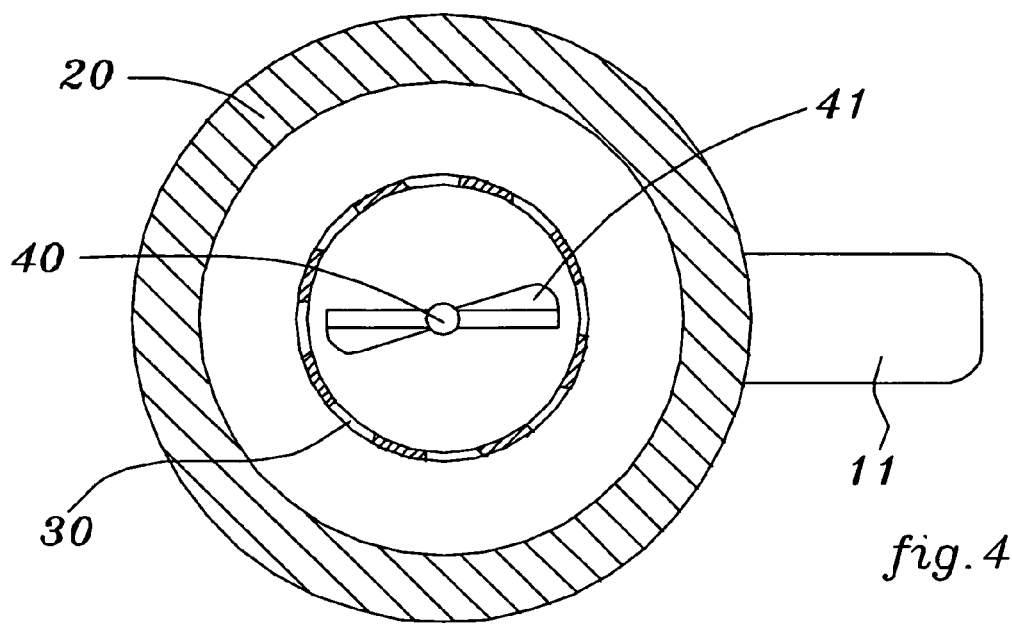
FIG. 4 is the cross section view of the FIG. 3 taken along the line of 3-3.
Figure 3:
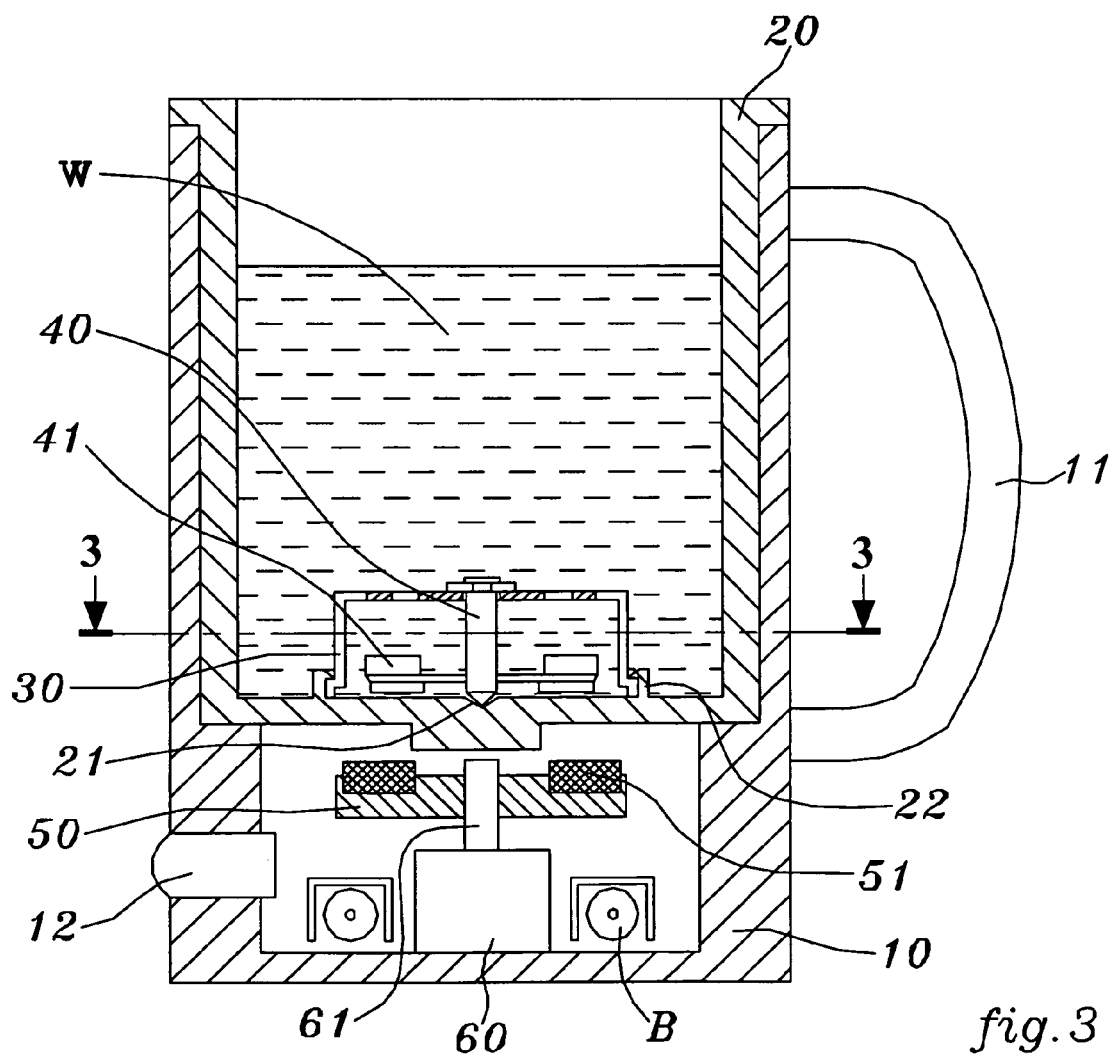
FIG. 3 is the plan cross section view of the present invention.

Referring to FIGS. 2 through 4, an automatic motor-driven blender cup with a leakage-free stirring apparatus according to a preferred embodiment of the present invention, comprises a blender cup 10, an internal chamber 20, a mounting frame 30, a stirring shaft 40, a magnetic disk 50 and a motor 60 with a dry battery B; Wherein, said blender cup 10 includes an internal chamber 20 formed upward with opening on the top side and a handle 3 disposed on the peripheral surface together with a push button 12; said internal chamber 20 is a hollow container having a miniature bearing notch 21 indented in the center of the inside bottom with some upstanding clasps 22 arranged and jutted around said bearing notch 21; said mounting frame 30 is a opening downward cannular frame with flange at the bottom rim such that being securely buckled by all said upstanding clasps 22 on said internal chamber 20; said stirring shaft 40 is formed with a cone-shaped front tip downward to be jointly inset with said bearing notch 21 in said internal chamber 20 and a rear pin end pivoted in the top center of said mounting frame 30 as well as a pair of horizontal stirring propellers 41, which being made of metal in good magnetic induction, is near the front shaft tip against the base wall of said internal chamber 20; said magnetic disk 50 is horizontally fixed on said output shaft 61 of said motor 60 with central axial line in alignment with that of said stirring shaft 40, and having some distance against the inner wall of the base portion of said internal chamber 20; on each blade of said magnetic disk 50, a magnetic element 51 is inset in correspondence with said stirring propeller 41; said motor 60 and dry battery B are disposed inside at the bottommost of said blender cup 10.

As shown in the figures of 3 and 4, the magnetic disk 50 will start to rotate in consequence of torque action from the output shaft 61 of the motor 60, which being actuated by conducting electric current upon depressing the push button 12 on the blender cup 10, meanwhile the stirring propeller 41 will start to rotate with stirring shaft 40 as central axle due to magnetic induction of each whose blade with that of the magnetic element 51; thereby the liquid or fluid W in the internal chamber 20 will be stirred to blend; Next, the magnetic disk 50 and the output shaft 61 of the motor 60 will stop rotating upon depressing again the push button 12 on the blender cup 10, meanwhile the stirring propeller 41 will stop rotating and stirring either due to magnetic induction of each whose blade with that of the magnetic element 51; Indeed, said stirring shaft 40 and said output shaft 61 of the motor 60 are isolated each other in the internal chamber 20 and the inside bottom space of the blender cup 10 respectively without any physical conducting path for the liquid or fluid W in the internal chamber 20 being leaked and seeped into the inside bottom space of the blender cup 10; hence the motor 60 and the dry battery B will not be short circuit or defectively damaged due to moisture affection.

Figure 5:
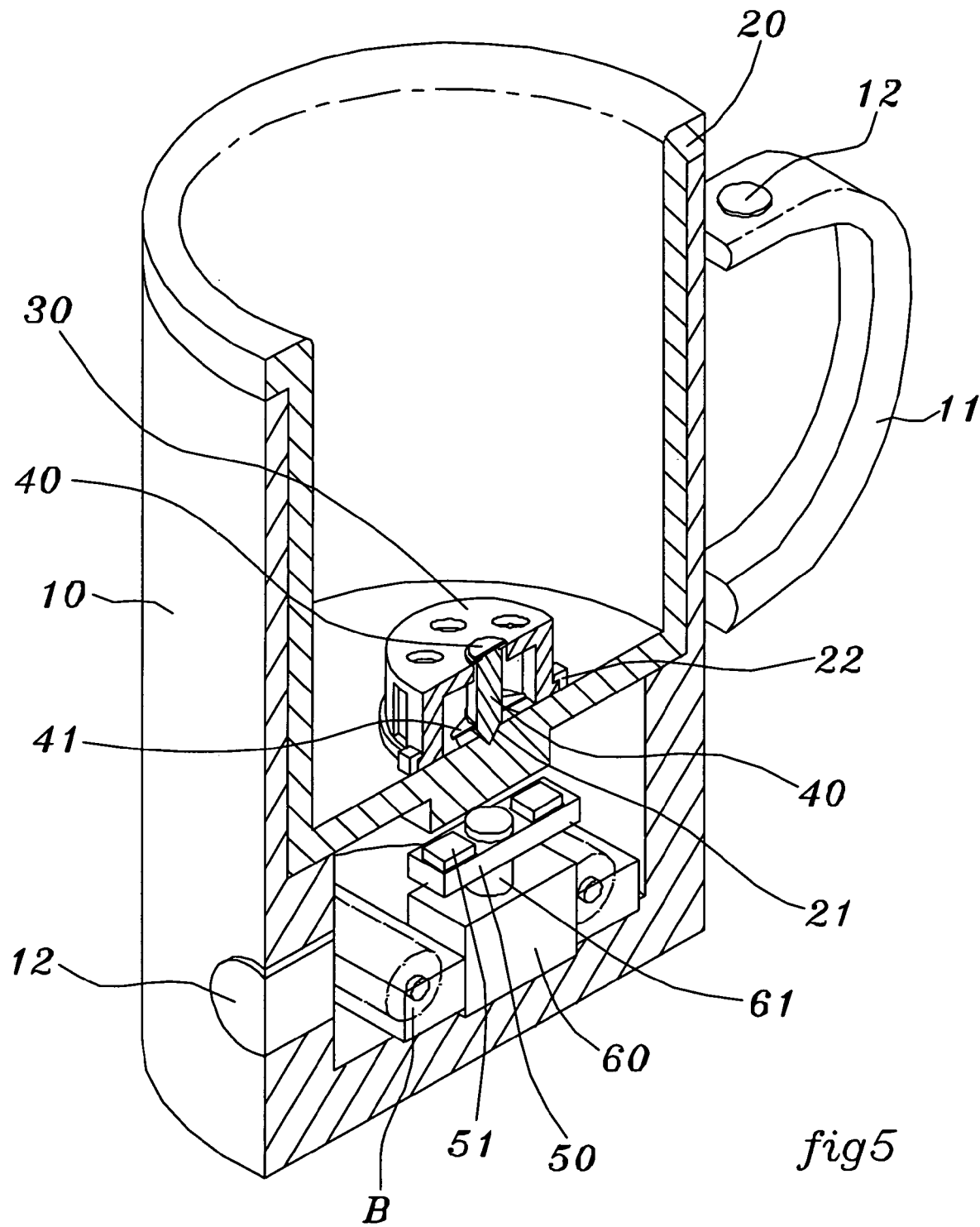
FIG. 5 is the perspective cross section view of the push button set on the handle in the present invention.

As shown in the FIG. 5, said push button 12 on the blender cup 10 can be disposed on said handle 11 for convenient depressing operation by the finger.

Figure 6:
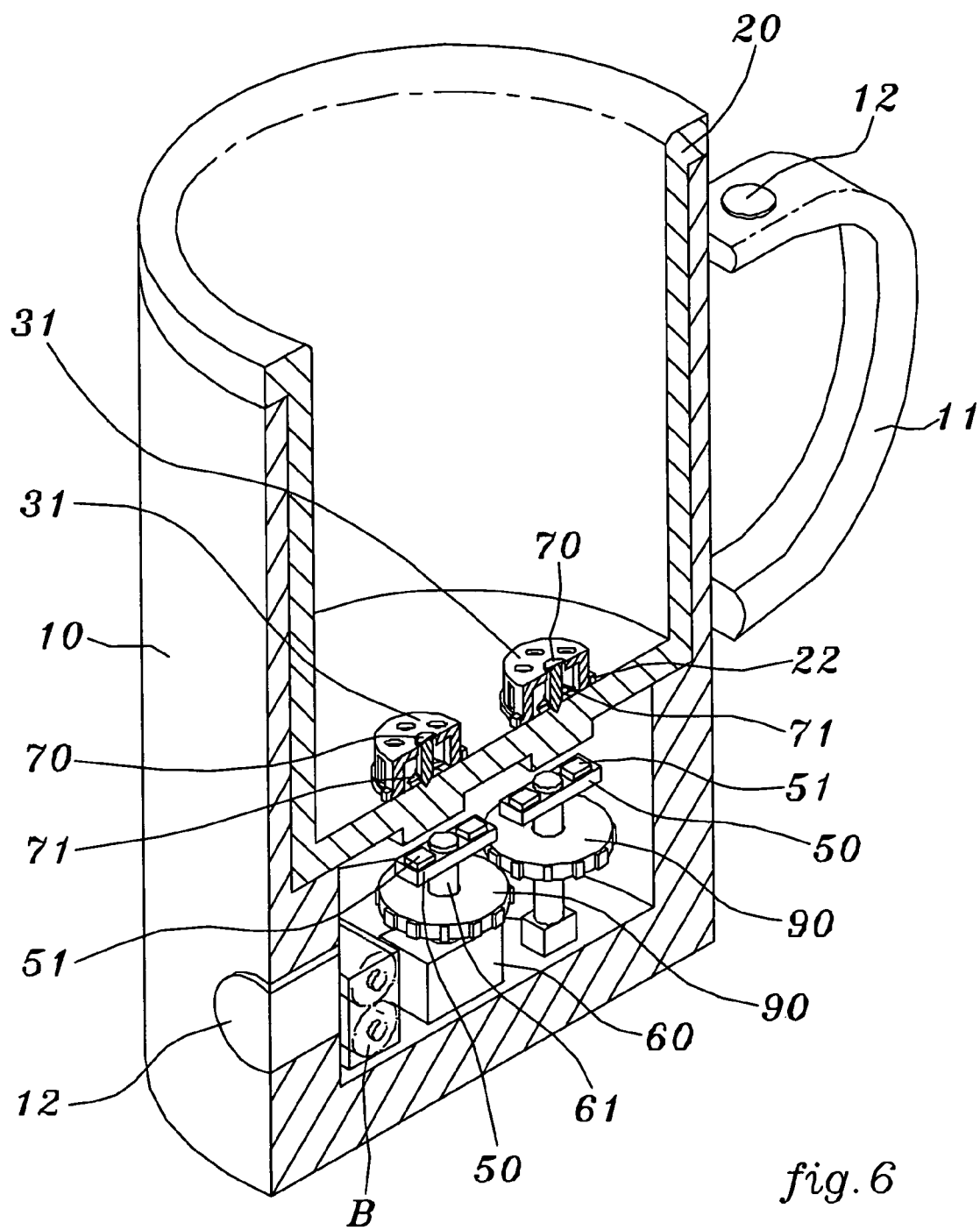
FIG. 6 is the perspective cross section view of another preferred embodiment of the present invention.
Figure 7:
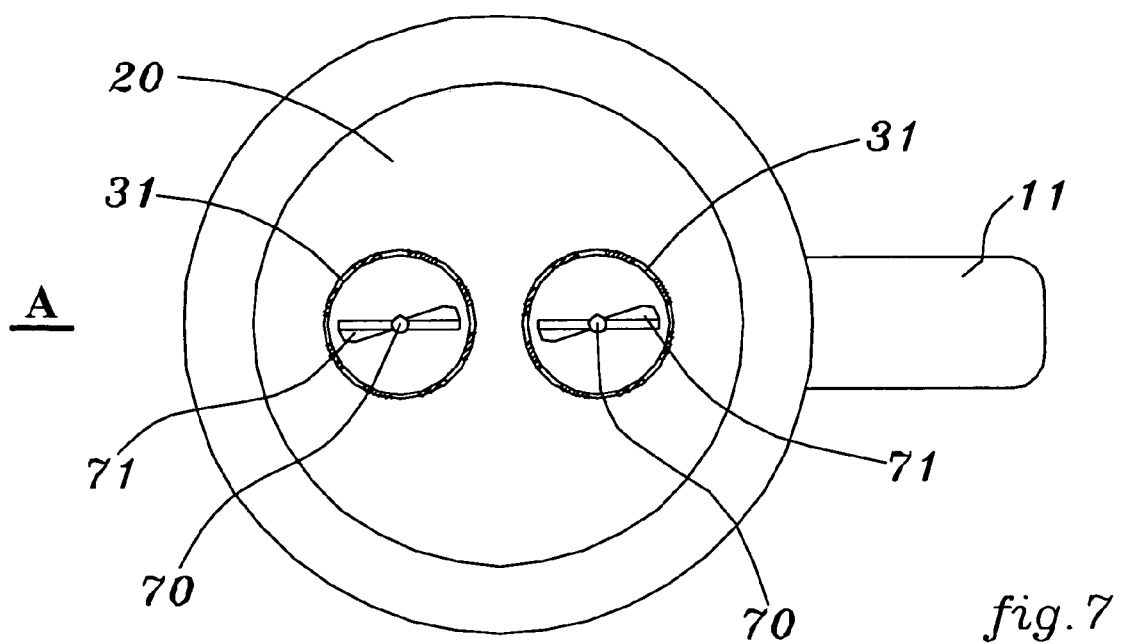
FIG. 7 is the plan cross section view of another preferred embodiment of the present invention.
Figure 7:
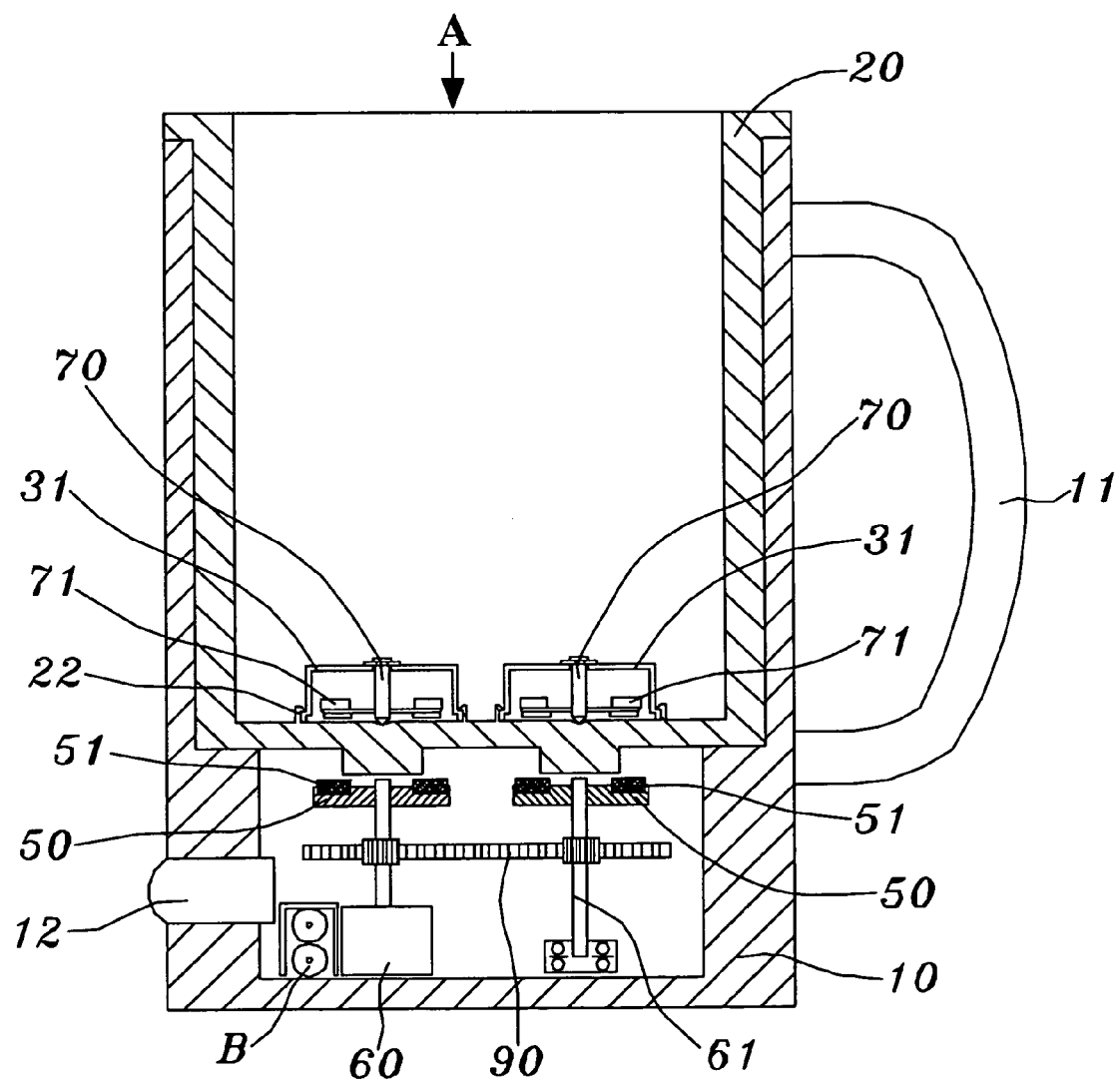

Referring to FIGS. 6 and 7, which is another preferred embodiment of the present invention, wherein said two sets of the stirring shafts 70, stirring propellers 71 and the mounting frames 31 are disposed in the bottom portion of said internal chamber 20 including additional dual gear set 90 coupled with said output shaft 61 of the motor 60, so that two sets of magnetic disks 50 can be driven by one motor 60; Thus, the better uniformity of the well-mixed effect is achieved due to the stirring speed and blending effect being doubled.

Figure 8:
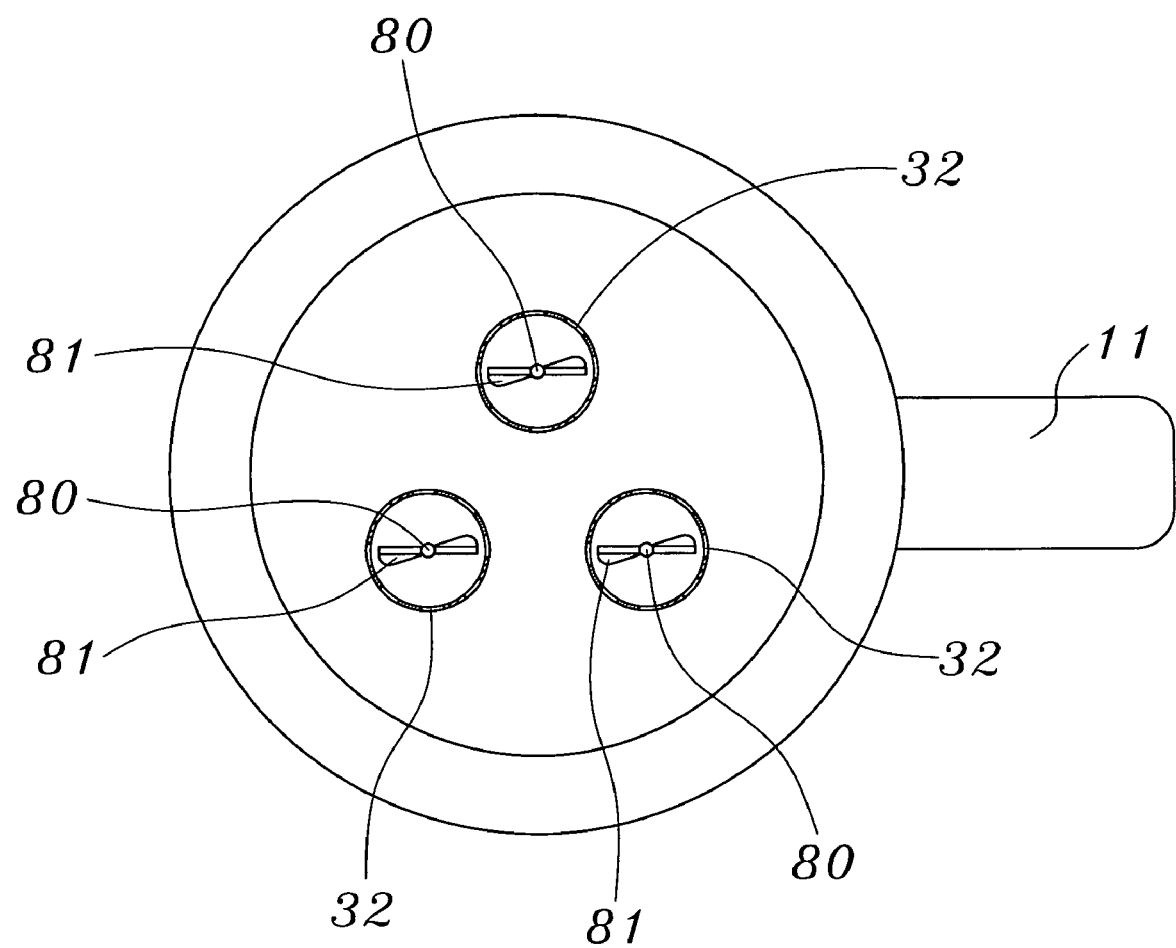
FIG. 8 is the top view of another preferred embodiment of the present invention.

As shown in the FIG. 8, which is another preferred embodiment of the present invention, wherein said three sets of the stirring shafts 80, stirring propellers 81 and the mounting frames 32 are further disposed in said internal chamber 20 including additional triple gear set 90 coupled with said output shaft 61 of the motor 60, so that three sets of magnetic disks 50 (not shown in the figure as self-explanatory analogue to the FIG. 7) can be driven by one motor 60 in order to provide better stirring speed and uniformity of blending effect.

What is claimed is:

1. An automatic motor-driven blender cup with a leakage-free stirring apparatus comprising:
    a blender cup including an internal chamber formed upward with opening on the top side and a handle disposed on the peripheral surface together with a push button;
    an internal chamber having a hollow container and a miniature bearing notch indented in the center of the inside bottom with some upstanding clasps arranged for jutted around said bearing notch of said internal chamber;
    a mounting frame having a opening downward cannular frame with flange at the bottom rim such that being securely buckled by all said upstanding clasps on said internal chamber;
    a stirring shaft is formed with a cone-shaped front tip downward and a rear pin end pivoted in the top center of said mounting frame as well as a pair of horizontal stirring propellers, which being made of metal in good magnetic induction, is near the front shaft tip against the base wall of said internal chamber;
    a magnetic disk is horizontally fixed on said output shaft of a motor with central axial line in alignment with that of said stirring shaft, and having some distance against the inner wall of the base portion of said internal chamber; on each blade of said magnetic disk, a magnetic element is inset in correspondence with said stirring propeller of said stirring shaft; and
    said motor and dry battery are disposed inside at the bottommost of said blender cup.

2. An automatic motor-driven blender cup with a leakage-free stirring apparatus as recited in the claim 1, wherein two sets of the stirring shafts, stirring propellers and the mounting frames are disposed in the bottom portion of said internal chamber including additional dual gear set coupled with said output shaft of the motor.

3. An automatic motor-driven blender cup with a leakage-free stirring apparatus as recited in the claim 1, wherein three sets of the stirring shafts, stirring propellers and the mounting frames are disposed in the bottom portion of said internal chamber including additional triple gear set coupled with said output shaft of the motor.

* * * * *